(12) United States Patent
Oh et al.

(10) Patent No.: US 10,308,104 B2
(45) Date of Patent: Jun. 4, 2019

(54) HYBRID TRANSAXLE

(71) Applicant: Ford Global Technologies, LLC, Dearborn, MI (US)

(72) Inventors: David Gon Oh, Ann Arbor, MI (US); David Allen Janson, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 136 days.

(21) Appl. No.: 15/405,637

(22) Filed: Jan. 13, 2017

(65) Prior Publication Data
US 2018/0201114 A1 Jul. 19, 2018

(51) Int. Cl.
| | |
|---|---|
| *B60K 6/365* | (2007.10) |
| *F16H 3/72* | (2006.01) |
| *B60K 6/40* | (2007.10) |
| *B60K 6/48* | (2007.10) |
| *F16H 37/08* | (2006.01) |
| *B60K 6/24* | (2007.10) |
| *B60K 6/26* | (2007.10) |
| *B60K 6/445* | (2007.10) |
| *F16H 48/08* | (2006.01) |

(52) U.S. Cl.
CPC .............. *B60K 6/365* (2013.01); *B60K 6/24* (2013.01); *B60K 6/26* (2013.01); *B60K 6/40* (2013.01); *B60K 6/445* (2013.01); *B60K 6/48* (2013.01); *F16H 3/724* (2013.01); *F16H 37/0806* (2013.01); *B60Y 2200/92* (2013.01); *B60Y 2400/73* (2013.01); *B60Y 2400/80* (2013.01); *F16H 48/08* (2013.01); *Y02T 10/6221* (2013.01); *Y10S 903/91* (2013.01)

(58) Field of Classification Search
CPC ..................... F16H 2200/0021; B60K 6/365
See application file for complete search history.

(56) References Cited

U.S. PATENT DOCUMENTS

| | | | |
|---|---|---|---|
| 5,558,595 A | 9/1996 | Schmidt et al. | |
| 6,371,882 B1 * | 4/2002 | Casey | F16H 3/728 475/2 |
| 6,429,541 B2 | 8/2002 | Takenaka et al. | |
| 7,395,735 B2 | 7/2008 | Enström et al. | |
| 7,686,723 B2 * | 3/2010 | Schondorf | B60K 6/365 475/149 |
| 8,696,505 B2 | 4/2014 | Lee et al. | |
| 8,727,932 B2 | 5/2014 | Shibata et al. | |
| 8,870,697 B2 | 10/2014 | Sada et al. | |
| 9,126,581 B2 | 9/2015 | Swales et al. | |
| 2010/0261565 A1 * | 10/2010 | Ai | B60K 6/365 475/5 |
| 2010/0320017 A1 * | 12/2010 | Besnard | B60K 6/365 180/65.23 |

(Continued)

FOREIGN PATENT DOCUMENTS

WO    2015097510 A1    7/2015

*Primary Examiner* — Tisha D Lewis
(74) *Attorney, Agent, or Firm* — David Kelley; Brooks Kushman P.C.

(57) ABSTRACT

A hybrid transaxle permits location of a traction motor in a more favorable location, decreasing the risk of occupant injury in a vehicle collision. Axis transfer gearing moves the generator off the engine axis. This permits placing the traction motor further forward without interference with the generator.

10 Claims, 2 Drawing Sheets

(56) References Cited

U.S. PATENT DOCUMENTS

2011/0042155 A1\* 2/2011 Tarasinski .............. B60K 6/365
180/65.6
2011/0300983 A1\* 12/2011 Kurokawa ............. B60K 6/365
475/5

\* cited by examiner

HYBRID TRANSAXLE

TECHNICAL FIELD

This disclosure relates to the field of vehicle transmissions. More particularly, the disclosure pertains to an arrangement of components in a hybrid transaxle.

BACKGROUND

Hybrid powertrains include energy storage devices such as batteries which are utilized to reduce fuel consumption by capturing braking energy and by permitting more efficient use of an internal combustion engine. The engine may be shut off while the vehicle is stationary. Also, the engine may be operated at higher power settings at which it is typically more efficient and then shut off a portion of the time that the vehicle is moving.

One type of hybrid powertrain is an electric power-split hybrid. At low speed, a planetary gear set divides the mechanical power generated by the internal combustion engine into two power flow paths. A portion of the power is conveyed to the drive wheels by gears, chains, or other mechanical power transfer components. The remaining power is directed to an electric machine and converted into electrical power. This electric machine is typically referred to as a generator although it may also be capable converting electrical power into mechanical power. A second electric machine drives the drive wheels. This second machine is typically referred to as a traction motor although it may be capable of converting mechanical power into electrical power. In some operating modes, all electrical power from the generator flows to the traction motor. In other operating modes, some electrical power may be diverted to a battery. In yet other operating modes, the battery may supplement the electrical power produced by the generator.

In a front wheel drive hybrid transaxle, the engine crankshaft rotates about an axis that is offset from and substantially parallel to an axle axis. The transaxle includes a differential on the axle axis which divides the power between left and right half-shafts that may rotate at slightly different speeds as the vehicle turns a corner. The space available for the transaxle is restricted by the size of the engine compartment and the space occupied by the engine. Even space which may not be occupied by other components may not be available due to considerations of how objects in that space would impact the passenger compartment in a collision.

SUMMARY OF THE DISCLOSURE

A hybrid transaxle includes first and second electric machines, a countershaft, and a planetary gear set. The first and second electric machines are arranged on first and second axes respectively. The countershaft is supported for rotation about a third axis and is driveable connected to the first electric machine. The first axis may be vertically above and horizontally forward of the third axis. The planetary gear set is arranged on a fourth axis. The third axis may be vertically above and horizontally aft of the fourth axis. The second axis may be horizontally forward of the fourth axis. A sun gear of the planetary gear set is driveably connected to the second electric machine. A carrier of the planetary gear set is fixedly coupled to an input shaft. A ring gear of the planetary gear set is driveably connected to the countershaft. The transaxle may also include a differential having an input arranged on a fifth axis. The fifth axis may be vertically below and horizontally aft of the third and fourth axes. A first gear may be fixedly coupled to the differential input. A second gear, meshing with the first gear, may be fixedly coupled to the countershaft.

A hybrid transaxle includes first and second electric machines and a planetary gear set. A sun gear of the planetary gear set is fixedly coupled to a second gear which meshes with the first gear. A carrier of the planetary gear set is fixedly coupled to an input shaft. A rotor of the first electric machine is fixedly coupled to a first gear. An axis of rotation of the first electric machine may be horizontally forward of the input shaft. The second electric machine is driveably connected to a differential carrier. For example, a rotor of the second electric machine may be fixedly coupled to a third gear which meshes with a fourth gear fixedly coupled to a countershaft. A fifth gear fixedly coupled to the countershaft may mesh with a sixth gear fixedly coupled to the differential carrier. The countershaft may be vertically above and horizontally aft of the input shaft. An axis of rotation of the second electric machine may be vertically above and horizontally forward of the countershaft. A ring gear of the planetary gear set is driveably connected to the differential carrier. For example, the ring gear may be fixedly coupled to a seventh gear which meshes with an eighth gear fixedly coupled to the countershaft. The differential carrier may be vertically below and horizontally aft of the countershaft and the input shaft.

A hybrid transaxle includes first and second electric machines, a countershaft, a planetary gear set, and a differential. The first and second electric machines are fixedly coupled to first and second gears respectively. The countershaft is fixedly coupled to third, fourth, and fifth gears. The fifth gear meshes with the first gear. A first element of the planetary gear set, such as a sun gear, is fixedly coupled to a sixth gear meshing with the second gear. A second element of the planetary gear set, such as a carrier, is fixedly coupled to an input. A third element of the planetary gear set, such as a ring gear, is fixedly coupled to a seventh gear meshing with the fourth gear. An input of the differential is fixedly coupled to an eighth gear meshing with the third gear.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A group of rotatable elements are fixedly coupled to one another if they are constrained to have the same rotational speed about the same axis in all operating conditions. Rotatable elements can be fixedly coupled by, for example, spline connections, welding, press fitting, or machining from a common solid. Slight variations in rotational displacement between fixedly coupled elements can occur such as displacement due to lash or shaft compliance. In contrast, two or more rotatable elements are selectively coupled by a shift element when the shift element constrains them to have the same rotational speed about the same axis whenever it is fully engaged and they are free to have distinct speeds in at least some other operating condition. Two rotatable elements are driveably connected if they are connected by a power flow path that constrains their rotational speeds to be proportional with a predetermined speed ratio. If the power flow path is established in all operating conditions, then the components are fixedly driveably connected. If the power flow path is established only when one or more shift elements are engaged, then the components are selectively driveably connected.

Figure 1:
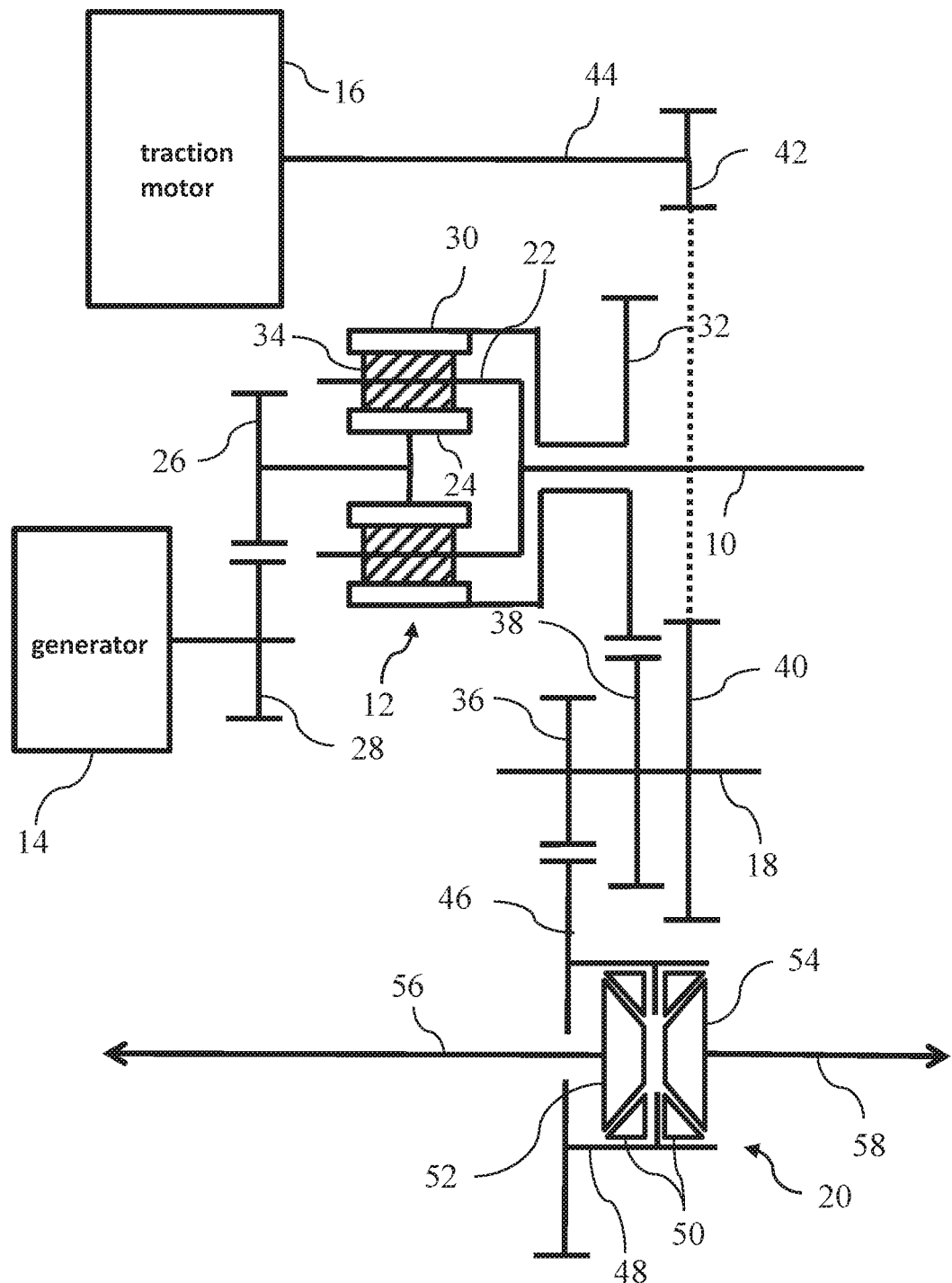
FIG. 1 is a schematic diagram of a five axis power-split hybrid transaxle.
Figure 2:
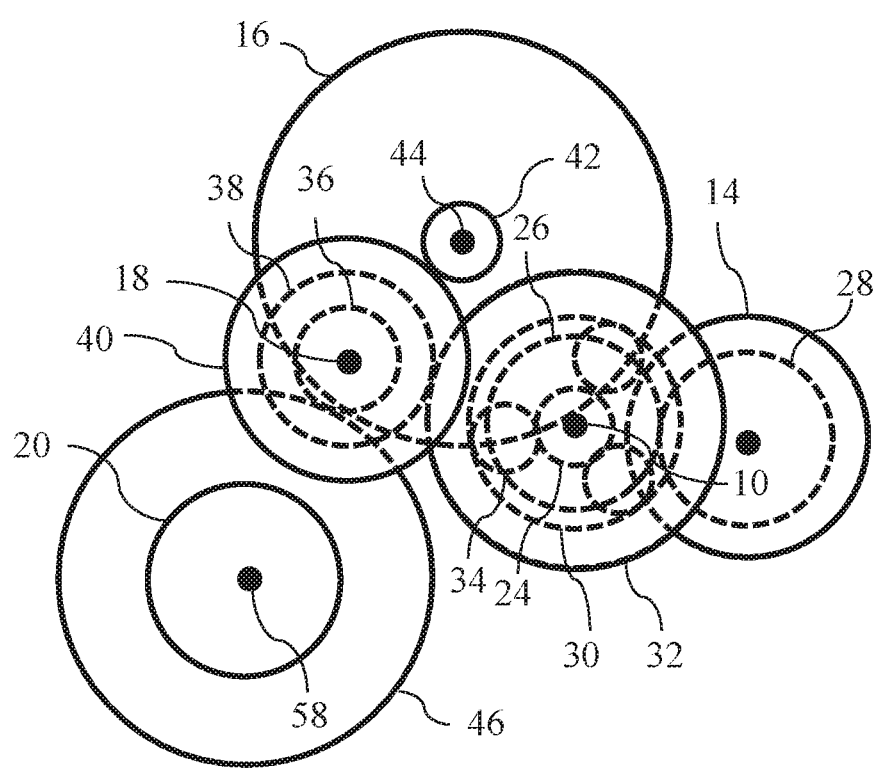
FIG. 2 is an end-view of the transaxle of FIG. 1.

FIGS. 1 and 2 illustrate a kinematic arrangement for a power-split hybrid transaxle. Power from an internal combustion engine is provides at input shaft 10. At relatively low vehicle speeds, this power is split into two power flow paths by planetary gear set 12. One of the power flow paths is entirely mechanical. In the other power flow path, mechanical power is converted into electrical power by generator 14 and then converted back into mechanical power by traction motor 16. In some operating conditions, some power in this electrical power flow path may be diverted to a battery for later use. In other operating conditions, power from the battery may be added to the electrical power flow path. The power of the two power flow paths is combined at countershaft 18 before being delivered to vehicle wheels via differential 20. Generator 14 and traction motor 16 are both reversible electric machines capable of converting mechanical power into electrical power and vice versa. They may be, for example, synchronous AC motors connected to a DC bus via corresponding inverters. At higher vehicle speeds, power may flow in the opposite direction in the electrical power flow path, establishing a recirculating power condition.

The carrier 22 of planetary gear set 12 is fixedly coupled to input shaft 10. The sun gear 24 is driveably connected to the rotor of generator 14 via gears 26 and 28. Specifically, gear 26 is fixedly coupled to sun gear 24 and in continuous meshing engagement with gear 28 which is fixedly coupled to the rotor of generator 14. Alternatively, sun gear 24 could be driveably connected to the rotor of generator 14 by a chain and sprockets. Ring gear 30 is fixedly coupled to a gear 32. In alternative embodiments, some of these connections may be reversed, such as connecting gear 32 to the carrier while connecting the input shaft to the ring. The input shaft 10, gear 28, sun gear 24, carrier 22, and ring gear 30 are all supported for rotation about a first axis. A set of planet gears 34 is supported for rotation with respect to carrier 22 and meshes with both sun gear 24 and ring gear 30. The rotor of generator 14 is supported for rotation about a second axis parallel to and offset from the first axis.

Countershaft 18 is supported for rotation about a third axis parallel to and offset from the first and second axes. Three gears, 36, 38, and 40 are fixedly coupled to countershaft 18. Gear 38 meshes with gear 32 and these two gears constitute the mechanical power flow path. The rotor of traction motor 16 is supported for rotation about a fourth axis parallel to and offset from the first, second, and third axes. Gear 42 is fixedly coupled to a rotor shaft 44 of traction motor 16. Gear 42 meshes with gear 40 as indicated by the dotted line. Gear 40 is larger in diameter than gear 42, thus eliminating the need for other torque multiplication components.

Gear 36 meshes with gear 46 which is fixedly coupled to a carrier 48 of the differential 20. A number of beveled planet gears 50 are supported for rotation with respect to differential carrier 48. The beveled planet gears each mesh with both left and right beveled side gears 52 and 54. The left and right side gears 52 and 54 are fixedly coupled to left and right half-shafts 56 and 58, respectively to transfer power to left and right wheels. Gear 46, differential carrier 48, and left and right side gears 52 and 54 are all supported for rotation about a fifth axis parallel to and offset from the first, second, third, and fourth axes. Left and right half-shaft 56 and 58 may include universal joints to accommodate slight differences between the fifth axis and the axes of rotation of the left and right wheels.

FIG. 2 shows the relative location of the five axes. In general, it is advantageous to have a transaxle that is compact in both the radial direction and the axial direction. However, the relative locations of the various axes must satisfy a number of constraints. Placing the generator and the traction motor at the same axial position reduces the axial length of the transaxle. In order to place them side by side, the separation between the second axis and the fourth axis must be sufficient. When generator 14 is located on the input axis, traction motor 16 must be located further aft (left in FIG. 2). Simulations of vehicle crash scenarios has indicated that positioning the traction motor further forward reduces the risk of occupant injury in an accident. Offsetting the generator to a forward axis permits locating the traction motor further forward (right in FIG. 2).

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, embodiments described as less desirable than other embodiments or prior art implementations with respect to one or more characteristics are not outside the scope of the disclosure and can be desirable for particular applications.

What is claimed is:
1. A hybrid transaxle comprising:
   first and second electric machines arranged on first and second axes respectively;
   a countershaft supported for rotation about a third axis and driveably connected to the first electric machine; and
   a planetary gear set arranged on a fourth axis and having a sun gear driveably connected to the second electric machine, a carrier fixedly coupled to an input shaft, and a ring gear driveably connected to the countershaft; and wherein:

the third axis is vertically above and horizontally aft of the fourth axis;

the first axis is vertically above and horizontally forward of the third axis; and the second axis is horizontally forward of the fourth axis.

2. The hybrid transaxle of claim 1 further comprising:
a differential having an input arranged on a fifth axis;
a first gear fixedly coupled to the differential input; and
a second gear fixedly coupled to the countershaft and meshing with the first gear; and wherein:
the fifth axis is vertically below and horizontally aft of the third and fourth axes.

3. The hybrid transaxle of claim 2 wherein the differential further comprises:
a carrier as the input;
left and right beveled side gears adapted for fixation to left and right half-shafts respectively; and
a plurality of beveled planet gears supported for rotation with respect to the carrier and meshing with both the left and right side gears.

4. The hybrid transaxle of claim 1 wherein the countershaft is driveably connected to the first electric machine by a third gear fixedly coupled to the countershaft and a fourth gear fixedly coupled to a rotor of the first electric machine and meshing with the third gear.

5. The hybrid transaxle of claim 1 wherein the sun gear is driveably connected to the second electric machine by a fifth gear fixedly coupled to the sun gear and a sixth gear fixedly coupled to a rotor of the second electric machine and meshing with the fifth gear.

6. A hybrid transaxle comprising:
a first electric machine having a rotor fixedly coupled to a first gear;
a second electric machine;
a planetary gear set having a sun gear fixedly coupled to a second gear meshing with the first gear, a carrier fixedly coupled to an input shaft, and a ring gear;
a third gear fixedly coupled to the ring gear;
a fourth gear fixedly coupled to a countershaft and meshing with the third gear;
a fifth gear fixedly coupled to the countershaft;
a sixth gear fixedly coupled to a differential carrier;
a seventh gear fixedly coupled to a rotor of the second electric machine; and
an eighth gear fixedly coupled to the countershaft and meshing with the seventh gear.

7. The hybrid transaxle of claim 6 wherein:
the countershaft is vertically above and horizontally aft of the input shaft;
an axis of rotation of the second electric machine is vertically above and horizontally forward of the countershaft;
an axis of rotation of the first electric machine is horizontally forward of the input shaft; and
the differential carrier is vertically below and horizontally aft of the countershaft and the input shaft.

8. The hybrid transaxle of claim 6 further comprising:
left and right beveled side gears adapted for fixation to left and right half-shafts respectively; and
a plurality of beveled planet gears supported for rotation with respect to the differential carrier and meshing with both the left and right side gears.

9. A hybrid transaxle comprising:
a first electric machine fixedly coupled to a first gear;
a second electric machine fixedly coupled to a second gear;
a countershaft fixedly coupled to a third gear, a fourth gear, and a fifth gear meshing with the first gear;
a planetary gear set having a sun gear fixedly coupled to a sixth gear meshing with the second gear, a carrier fixedly coupled to an input shaft, and a ring gear fixedly coupled to a seventh gear meshing with the fourth gear; and
a differential having an input fixedly coupled to an eighth gear meshing with the third gear.

10. The hybrid transaxle of claim 9 wherein the differential further comprises:
a carrier as the input;
left and right beveled side gears adapted for fixation to left and right half-shafts respectively; and
a plurality of beveled planet gears supported for rotation with respect to the carrier and meshing with both the left and right side gears.

* * * * *